United States Patent
Kimura et al.

(10) Patent No.: US 10,157,300 B2
(45) Date of Patent: Dec. 18, 2018

(54) INFORMATION PROVISION SYSTEM, COMMUNICATION TERMINAL, AND INFORMATION PROVISION PROGRAM

(71) Applicant: DENSO CORPORATION, Kariya, Aichi-pref. (JP)

(72) Inventors: Yousuke Kimura, Kariya (JP); Masatoshi Itoh, Kariya (JP); Masatoshi Aboh, Kariya (JP); Hiroki Ukai, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 15/317,472

(22) PCT Filed: Jul. 24, 2015

(86) PCT No.: PCT/JP2015/003715
§ 371 (c)(1),
(2) Date: Dec. 9, 2016

(87) PCT Pub. No.: WO2016/031131
PCT Pub. Date: Mar. 3, 2016

(65) Prior Publication Data
US 2017/0140186 A1    May 18, 2017

(30) Foreign Application Priority Data
Aug. 29, 2014   (JP) ................... 2014-175770

(51) Int. Cl.
*G06K 7/10*   (2006.01)
*G06F 17/30*   (2006.01)
(Continued)

(52) U.S. Cl.
CPC ... *G06K 7/10722* (2013.01); *G06F 17/30879* (2013.01); *G06K 7/1417* (2013.01);
(Continued)

(58) Field of Classification Search
CPC .......... G06Q 30/0255; G06Q 30/0251; G06Q 30/0261; G06Q 30/0267; G06Q 30/0607;
(Continued)

(56) References Cited

U.S. PATENT DOCUMENTS 9,229,089 B2 *   1/2016   Do ........................ G01C 21/20
9,606,714 B2 *   3/2017   Reynolds .............. G06F 3/0346
(Continued)

FOREIGN PATENT DOCUMENTS

JP   2004221819 A   8/2004
JP   2005337867 A   12/2005
(Continued)

*Primary Examiner* — Claude J Brown
(74) *Attorney, Agent, or Firm* — Harness, Dickey & Pierce, P.L.C.

(57) ABSTRACT

An information provision system includes: a reading section that reads an information code; a situation acquisition section that acquires a situation when the information code is read by the reading section; a determination section that determines a situation when the information code is read, based on (i) read information that is obtained by decoding the information code that is read and (ii) the situation acquired by the situation acquisition section; a provided information generation section that generates provided information that is different from the read information, the provided information matching with the situation when the information code is read; and a provision section that provides the provided information that is generated.

18 Claims, 8 Drawing Sheets

(51) Int. Cl.
   *G06K 7/14*    (2006.01)
   *G06Q 30/06*   (2012.01)
   *G06Q 30/02*   (2012.01)

(52) U.S. Cl.
   CPC ......... *G06Q 30/02* (2013.01); *G06Q 30/0607* (2013.01); *G06Q 30/0261* (2013.01); *G06Q 30/0267* (2013.01); *G06Q 30/0269* (2013.01); *G06Q 30/0639* (2013.01)

(58) Field of Classification Search
   CPC ............ G06Q 30/0639; G06Q 30/0269; G06F 17/30879; G06K 7/10722; G06K 7/1417
   USPC .................................................... 235/462.11
   See application file for complete search history.

(56) References Cited

U.S. PATENT DOCUMENTS

| | | | | |
|---|---|---|---|---|
| 2008/0201305 A1* | 8/2008 | Fitzpatrick | ........ | G06F 17/30867 |
| 2010/0121705 A1* | 5/2010 | Ramer | ................... | G06Q 30/02 705/14.46 |
| 2010/0153211 A1* | 6/2010 | Ramer | ................... | G06Q 10/10 705/14.52 |
| 2011/0264586 A1* | 10/2011 | Boone | ................... | G06Q 20/20 705/67 |
| 2012/0223131 A1* | 9/2012 | Lim | ................... | G06F 17/30879 235/375 |
| 2013/0124186 A1* | 5/2013 | Donabedian | .......... | G06F 17/289 704/2 |
| 2013/0256398 A1* | 10/2013 | Godsey | .............. | G06Q 30/0207 235/375 |
| 2014/0229251 A1* | 8/2014 | Lim | ................... | G06Q 30/0252 705/14.5 |

FOREIGN PATENT DOCUMENTS

| | | |
|---|---|---|
| JP | 2006084226 A | 3/2006 |
| JP | 2006201195 A | 8/2006 |
| JP | 2007236537 A | 9/2007 |
| JP | 2008181504 A | 8/2008 |
| JP | 2008250801 A | 10/2008 |
| JP | 2009278161 A | 11/2009 |
| JP | 2011010136 A | 1/2011 |
| JP | 2014109964 A | 6/2014 |

* cited by examiner

| ITEMS | INFO |
|---|---|
| HOME | 34.xxxxxx, 137.xxxxxx |
| SCHEDULE | FROM 12:00 ON JULY 5······<br>···<br>FROM 13:00 ON JULY 20······ |
| HISTORY | (HISTORY IN MANIPULATING TERMINAL, HISTORY IN USER'S ACTION, ··· ) |
| ... | ... |

FIG. 3

| SPOT | NAME | POSITION | GOODS | DETAIL | COUNTER |
|---|---|---|---|---|---|
| DEPART. | XX | 35.xxxxxx, 136.xxxxxx | CLOTHES | ... | NORTH-EAST IN 2F |
|  |  |  | FOOD | ... | SOUTH IN 1F |
|  |  |  | ... | ... | ... |
| DEPART. | YY | 35.xxxxxx, 136.xxxxxx | GIFT | ... | IN B1F |
|  |  |  |  | ... | ... |
| RESTAURANT | ZZ | 35.xxxxxx, 137.xxxxxx | MEAL | ... | ... |
| ... | ... | ... | ... | ... |  |

FIG. 7

| SPOT | SHOPS | POSITION | TIME |
|---|---|---|---|
| EVENT | AAA SHOW | 40.xxxxxx, 142.xxxxxx | 13:00-15:00 |
| SIGHTSEEING | BBB SHRINE | 42.xxxxxx, 139.xxxxxx | 9:00-17:00 |
| SIGHTSEEING | CCC TOWER | 40.xxxxxx, 144.xxxxxx | 10:00-21:00 |
| MEAL | CAFÉ DDD | 40.xxxxxx 141.xxxxxx | |

FIG. 9

INFORMATION PROVISION SYSTEM, COMMUNICATION TERMINAL, AND INFORMATION PROVISION PROGRAM

CROSS REFERENCE TO RELATED APPLICATIONS

This application is a U.S. National Phase Application under 35 U.S.C. 371 of International Application No. PCT/JP2015/003715 filed on Jul. 24, 2015 and published in Japanese as WO 2016/031131 A1 on Mar. 3, 2016. This application is based on and claims the benefit of priority from Japanese Patent Application No. 2014-175770 filed on Aug. 29, 2014. The entire disclosures of all of the above applications are incorporated herein by reference.

TECHNICAL FIELD

The present disclosure relates an information provision system, a communication terminal, and an information provision program, which provide information matching with a situation.

BACKGROUND ART

There is known an information code such as a QR code (registered trademark) that codes predetermined information. Such an information code can provide much information in a comparatively small space, and enables a user to activate a program corresponding to the read-out information in a user's communication terminal as described in Patent literature 1, for instance. The information code thus provides high convenience and is used widely.

PRIOR ART LITERATURES

Patent Literature

Patent literature 1: JP 2008-181504 A

SUMMARY OF INVENTION

The information code codes the information that is predetermined; the information obtained when the information code is read is thus unchanged. This poses an action executed according to the information read from the information code to be always identical.

The information code fixedly coding predetermined information fails to provide information matching with various situations that are assumed to be taking place when the information code is read. Much information may be coded previously in order to match with various situations; this needs a large space for the information code coding much information to be printed on magazines or be displayed on a signboard, for instance. Further, a URL of homepage of a shop may be coded to enable a user to voluntarily retrieve the information; the user needs to perform a manipulation on each retrieving, feeling troublesome.

It is an object of the present disclosure to provide an information provision system, a communication terminal, and an information provision program, which provide information matching with various situations when an information code coding predetermined information is read.

According to an example of the present disclosure, an information provision system is provided to include a reading section, a situation acquisition section, a determination section, a provided information generation section, and a provision section. The reading section reads an information code that codes predetermined information. The situation acquisition section acquires a situation when the information code is read by the reading section. The determination section determines a situation when the information code is read, based on (i) read information that is obtained by decoding the information code that is read and (ii) the situation acquired by the situation acquisition section. The provided information generation section generates provided information that is different from the read information, the provided information matching with the situation when the information code is read, based on a determination result by the determination section. The provision section provides the provided information generated by the provided information generation section.

Such a configuration can provide information matching with various situations taking place when reading the information code coding predetermined information.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following explains an embodiment of the present disclosure with reference to FIGS. 1 to 9.

Figure 1:
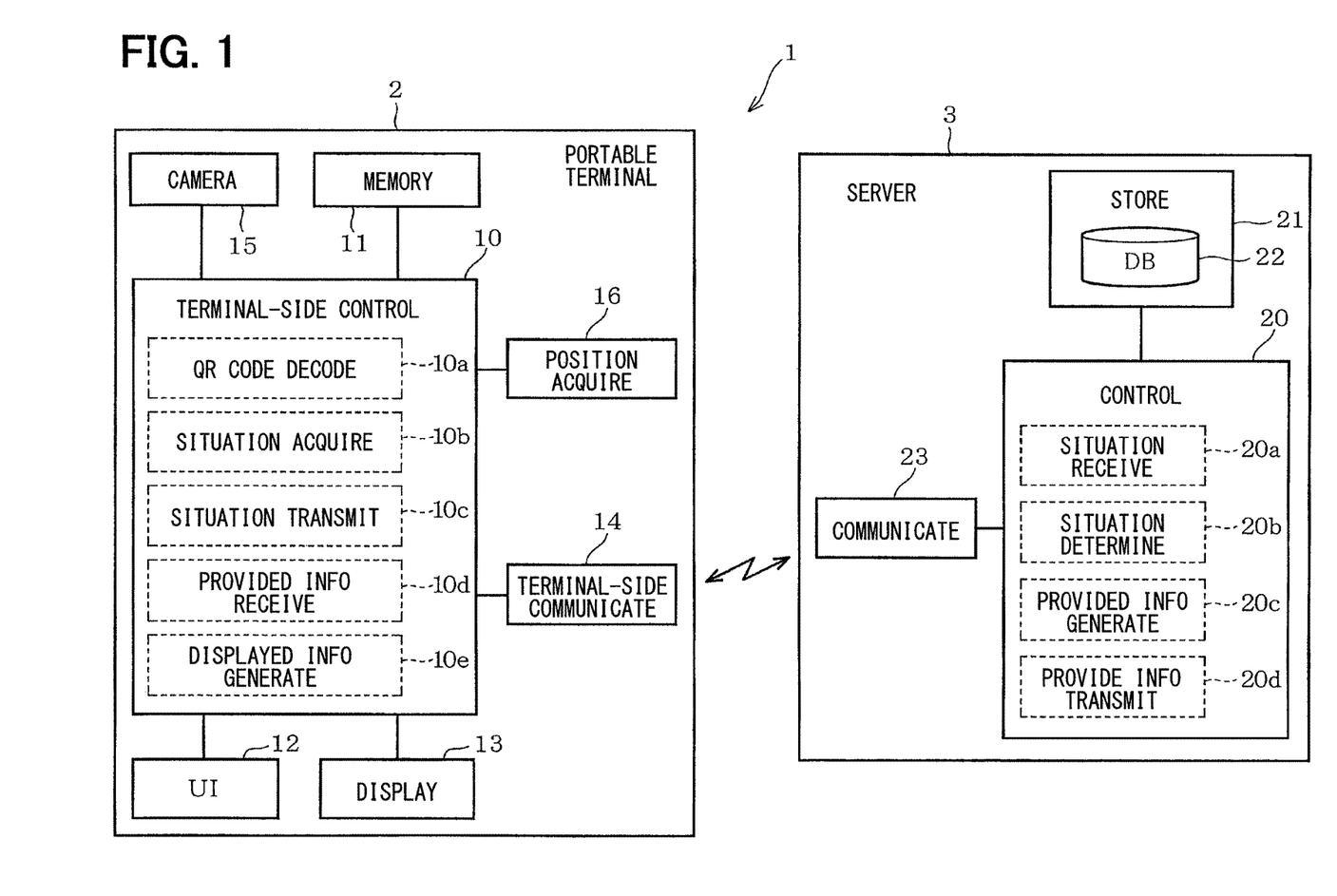
FIG. 1 is a diagram illustrating schematically an electrical configuration of an information provision system according to an embodiment.

As in FIG. 1, an information provision system 1 includes a server 3 and a portable terminal 2 serving as a communication terminal. The present embodiment assumes that the portable terminal 2 is a so-called smart phone, and an information code is a QR code.

The portable terminal 2 includes a control circuit 10, a memory 11, a UI (User Interface) unit 12, a display unit 13, a terminal-side communication unit 14, a camera 15, and a position acquisition unit 16. The portable terminal 2 includes a calendar function to acquire date and time, and a phone-call function, like a typical smart phone.

The control circuit 10 includes a microcomputer having a CPU, ROM, and RAM (none shown), as an example. The control circuit 10 executes a computer program stored in the memory 11 including a semiconductor memory and controls the whole of the portable terminal 2. The control circuit 10 includes a QR code decoding section 10*a*, a situation acquisition section 10*b*, a situation transmission section 10*c*, a provided information reception section 10*d*, and a displayed information generation section 10*e*. The QR code decoding section 10*a*, situation acquisition section 10*b*, situation transmission section 10*c*, provided information reception section 10*d*, and displayed information generation section 10*e* are achieved by a computer program executed by the control circuit 10 under a software configuration. In addition, all or part of each of the QR code decoding section 10*a*, the situation acquisition section 10*b*, the situation transmission section 10*c*, the provided information reception section 10*d*, and the displayed information generation section 10*e* may be achieved under a hardware configuration, as another example.

The QR code decoding section 10*a* decodes a QR code that is read in or scanned by the camera 15 serving as an imaging unit. That is, the QR code decoding section 10*a* decodes the read QR code, and acquires the information coded in the QR code as read information. The QR code decoding section 10*a* and the camera 15 are included in a reading section or device. The read information includes information such as homepages, individual shops, individual events, categories like shop information or event information.

The situation acquisition section 10*b* acquires the situation at the time of reading the QR code. The situation acquired by the situation acquisition section 10*b* in the present embodiment includes the followings: a position at the time of reading the information code; a clock time at the time of reading the information code; at least either an action history of a user who performs a manipulation of reading the information code, and an action schedule of the user; and a type of a terminal that reads the information code. The action history or action schedule of the user is assumed to be stored in the memory 11 using a schedule function of the portable terminal 2.

The position at the time of reading the information code includes a present position acquired with the position acquisition unit 16 including a GPS (Global Positioning System) receiver, i.e., position information at the time when the user performs a manipulation of reading the information code. In addition, a position includes not only coordinates but also regions or names, categories such as home or station, or transportation methods such as train or private vehicle.

The type of terminal that reads the information code includes information indicating whether to be a smart phone, whether to be a cell phone having a display window smaller than that of a smart phone, or whether to be a terminal such as a tablet PC having a large display screen or a CPU providing relatively high performance.

In addition, in the present embodiment, at least one of the QR code captured by the camera 15 and the read information obtained from decoding by the QR code decoding section 10*a* is stored in the memory 11. The situation acquisition section 10*b* thus acquires the situation at the time of reading the QR code or the read information whichever is stored in the memory 11, in addition to the situation at the time of reading the QR code. The situation acquisition section 10*b* is included in a situation acquisition section or device.

The situation transmission section 10*c* transmits the situation acquired by the situation acquisition section 10*b*, and the read information obtained from decoding by the QR code decoding section 10*a*, to the server 3 via the terminal-side communication unit 14. The QR code itself captured may be transmitted in place of the read information. The situation transmission section 10*c* and the terminal-side communication unit 14 communicating with the server 3 are included in a transmission section or device. The terminal-side communication unit 14 communicates with the server 3 via a wide area network such as the Internet. The server 3 is able to be positioned in the wide area network by a predetermined network address, by which the terminal-side communication unit 14 of the portable terminal 2 communicates with the server 3 over the wide area network.

The provided information reception section 10*d* receives the provided information generated by the server 3. The provided information, which is mentioned later for details, assists a user using the information code to take an action accompanied by travel. The provided information reception section 10*d* and the terminal-side communication unit 14 are included in a reception section or device.

The displayed information generation section 10*e*, which is mentioned later for details, generates the displayed information for the display in the display unit 13 based on the received provided information. In addition, the displayed information generation section 10*e* performs selection and activation of an application program for providing the provided information based on the received provided information.

The UI unit 12, which is used for inputting user's manipulation, includes a microphone, a speaker, switches, or a touch panel installed on a screen of the display unit 13 (none shown), in the present embodiment.

The display unit 13, which includes a liquid crystal panel or an organic EL panel, displays various kinds of information. The display unit 13 and the displayed information generation section 10*e* are included in a provision section or device.

Figure 2:
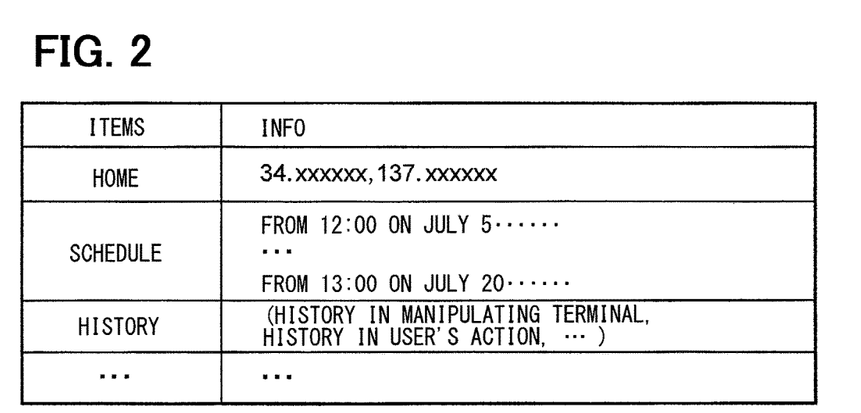
FIG. 2 is a diagram illustrating an example of information stored in a portable terminal.

The portable terminal 2 stores the information as in FIG. 2 in the memory 11. The portable terminal 2 holds the position of home that is registered as position information such as latitude and longitude, for example. In addition, the portable terminal 2 holds an action schedule of the user such as "go shopping at XX department store from 12 o'clock on July 5," "visit AAA show from 15 o'clock" on July 20," to be registered as a schedule. In addition, the portable terminal 2 holds the action history of the user or the manipulation history of the terminal to be registered as a history. The information registered in the portable terminal 2 is not limited to the items exemplified in FIG. 2. For example, the attribute information indicating an attribute of the user such as gender, affiliated organization, or age may be stored.

The server 3 includes a known computer system, as an example. As in FIG. 1, the server 3 includes a control circuit 20, a storage unit 21 including a storage media such as a hard disk, a DB 22 that is a database stored in the storage unit 21, and a communication unit 23 that communicates with the portable terminal 2. The information provision system 1 may not be limited to a configuration having a single server 3. Another configuration may be provided to have several different servers 3 having respective DBs 22, or several different servers 3 cooperating with each other to share a single large-scaled DB 22. An example configuration of the different servers 3 cooperating with each other is as follows. The server 3 holds the timetable of trains to be registered in own DB 22, while acquiring from the DB 22 of the train operation company whether any delay takes place due to an accident or weather condition.

The control circuit 20 of the server 3 includes a situation reception section 20*a*, a situation determination section 20*b*, a provided information generation section 20c, and a provided information transmission section 20d. The situation reception section 20a, the situation determination section 20b, the provided information generation section 20c, and the provided information transmission section 20d are achieved by a computer program executed by the control circuit 20 in a software configuration, as an example. In addition, all or part of each of the situation reception section 20a, the situation determination section 20b, the provided information generation section 20c, and the provided information transmission section 20d may be achieved in a hardware configuration, as another example.

The situation reception section 20a receives the situation and read information which are transmitted from the portable terminal 2, via the communication unit 23.

The situation determination section 20b determines a situation when the information code coding the read information is read, based on the situation and the read information which are received by the situation reception section 20a. The situation determination section 20b functions as a determination section or device.

The provided information generation section 20c generates the provided information, which is different from the read information and matches with the situation when the information code is read, based on the determination result by the situation determination section 20b. In addition, suppose the case that the information code or the read information is read out from the memory 11 and the situation at this time is acquired and transmitted as described above. In this case, the provided information generation section 20c generates the provided information matching with the situation when the information code or the read information is read out from the memory 11. In particular, the provided information generation section 20c can generate mutually different kinds of the provided information based on the determination result by the situation determination section 20b, even if the identical information code is read.

In addition, the provided information generation section 20c generates the provided information using the DB 22 where various kinds of information are registered to be associated with each other. In addition, the provided information generation section 20c may use another server 3 to acquire the information like the above-mentioned train operating situation for complementing the own DB 22 and generate the provided information in considering the acquired information.

The provided information transmission section 20d transmits the provided information generated by the provided information generation section 20c to the portable terminal 2 via the communication unit 23.

Figure 3:
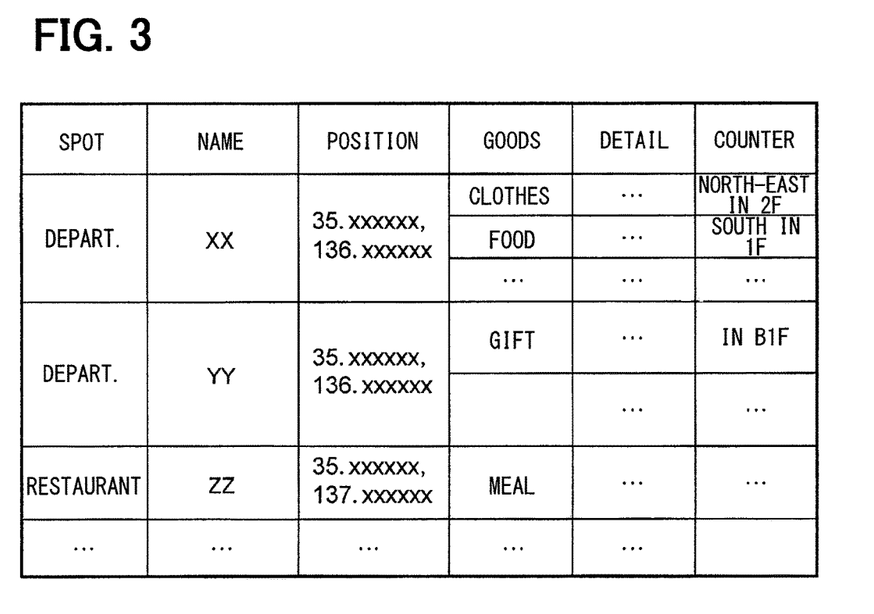
FIG. 3 is a diagram illustrating an example of information registered in a database of a server.

The server 3 stores various kinds of information as illustrated in FIG. 3 as the DB 22. The DB 22 stores various kinds of information to be registered and classified depending on respective categories such as spots. For example, the category of department store includes XX department store to which various kinds of information such as position information, goods for sale indicating handling items, details of goods for sale, counters are registered. Further, the category of the department store includes YY department store to which various kinds of information are registered; the category of the restaurant includes neighboring bistro ZZ to which various kinds of information are registered.

Figure 4:
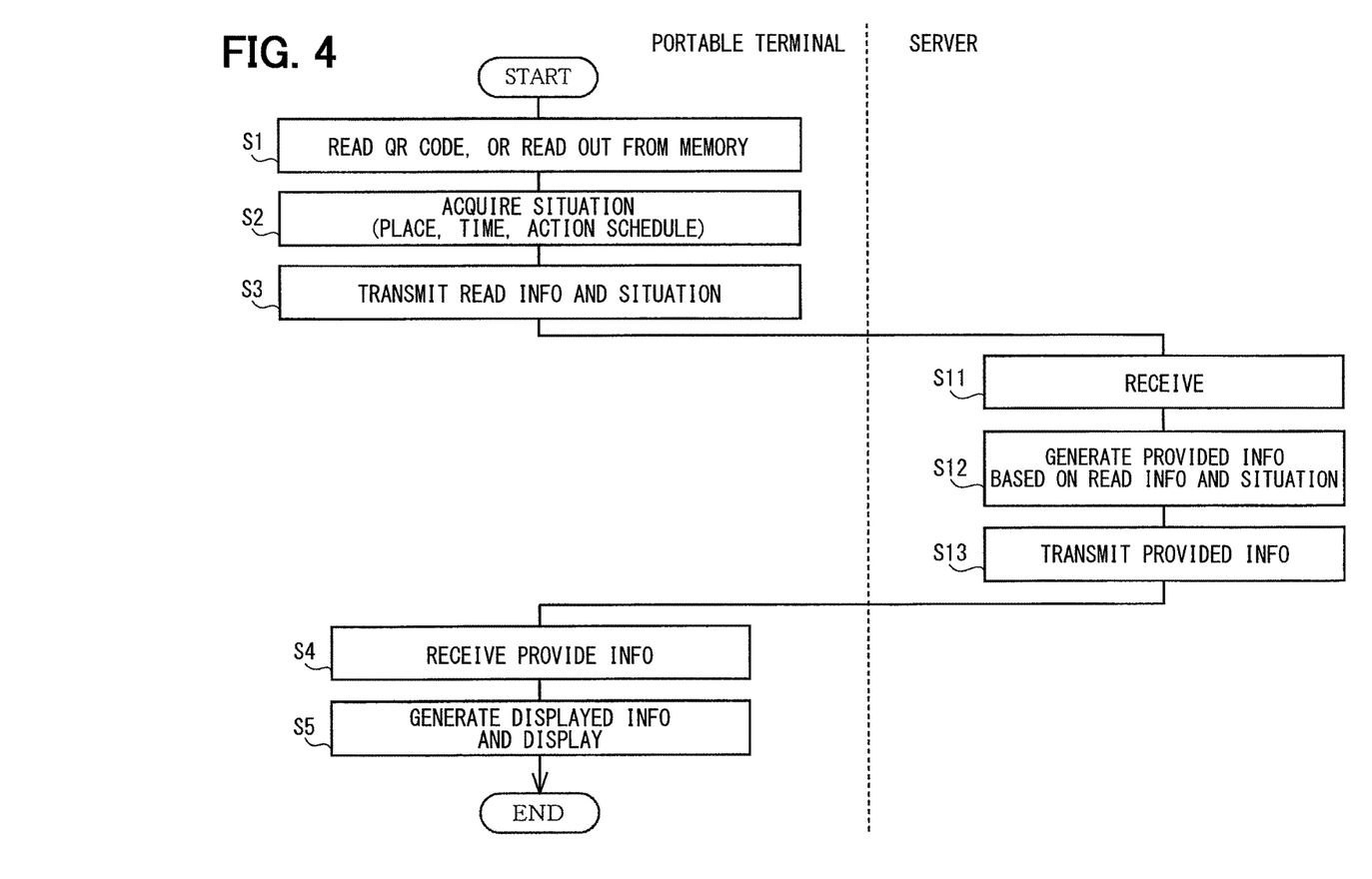
FIG. 4 is a diagram illustrating a sequence of processing in a portable terminal and a server.

The following explains operations of the above configuration with reference to a sequence of processing in FIG. 4, and specific examples in FIGS. 5 to 9.

First explains a sequence of processing in the information provision system 1.

In using QR codes, a user reads a QR code with the camera 15, or reads either a QR code having been read in the past or read information having been obtained by decoding a QR code in the past, from the memory 11. At this time, the portable terminal 2 performs either reading of the QR code or reading out the QR code from the memory 11, depending on a manipulation by the user (S1). Note that S signifies a section or a step. Here, S1 is equivalent to a reading process. Then, the portable terminal 2 acquires a situation (S2). The acquired situation includes a position at which the reading manipulation is conducted (i.e., a present position acquired by the position acquisition unit 16), or a position of home or an action schedule among various information exemplified in FIG. 2. Here, S2 is equivalent to an acquisition process. The portable terminal 2 transmits the read information and the acquired situation to the server 3 (S3). Here, S3 is equivalent to a transmission process.

The server 3, which stands by usually, receives the read information and the situation from the portable terminal 2 (S11), and generates provided information based on the read information and the situation (S12). The server 3 transmits the generated provided information to the portable terminal 2 (S13).

Upon receiving the provided information from the server 3 (S4), the portable terminal 2 generates displayed information based on the received provided information and displays the generated displayed information in the display unit 13, providing a user with the provided information. Here, S4 is equivalent to a reception process, and S5 is equivalent to a provision process.

The information provision system 1 of the present embodiment thus provides the user with the information, using the portable terminal 2 and the server 3 which cooperate with each other. The present embodiment executes the processes in the portable terminal 2 using a dedicated application program. In addition to the above-mentioned reading process, situation acquisition process, transmission process, reception process, and provision process, the application program can execute a recording process that records the read QR code or the read information obtained by decoding the read QR code, in the memory 11, and a reading process that reads the QR code or read information, stored in the memory 11. This application program is equivalent to an information provision program (product). Further, the information provision program (product) is recorded on a non-transitory computer-readable tangible storage medium and can be provided as a method including the processes to execute as instructions.

The following explains specific examples: "situation A: go shopping at department store" as in FIG. 5; "situation B: participate event" as in FIGS. 6 and 7; "situation C: change provided information depending on positions" as in FIG. 8; and another provision mode as in FIG. 9.

<<Situation A>>

The situation A assumes that the information exemplified in FIG. 2 is registered in the portable terminal 2 that the user owns, and the information exemplified in FIG. 3 is registered in the DB 22 in the server 3. The situation A1 is explained to be associated with the sequence of the process in FIG. 4; the situations A2 and A3, the situations B1 to B3, and the situations C1 to C3 are explained without being associated with the sequence of the process, for simplifying the explanation.

<Situation A1>

Figure 5:
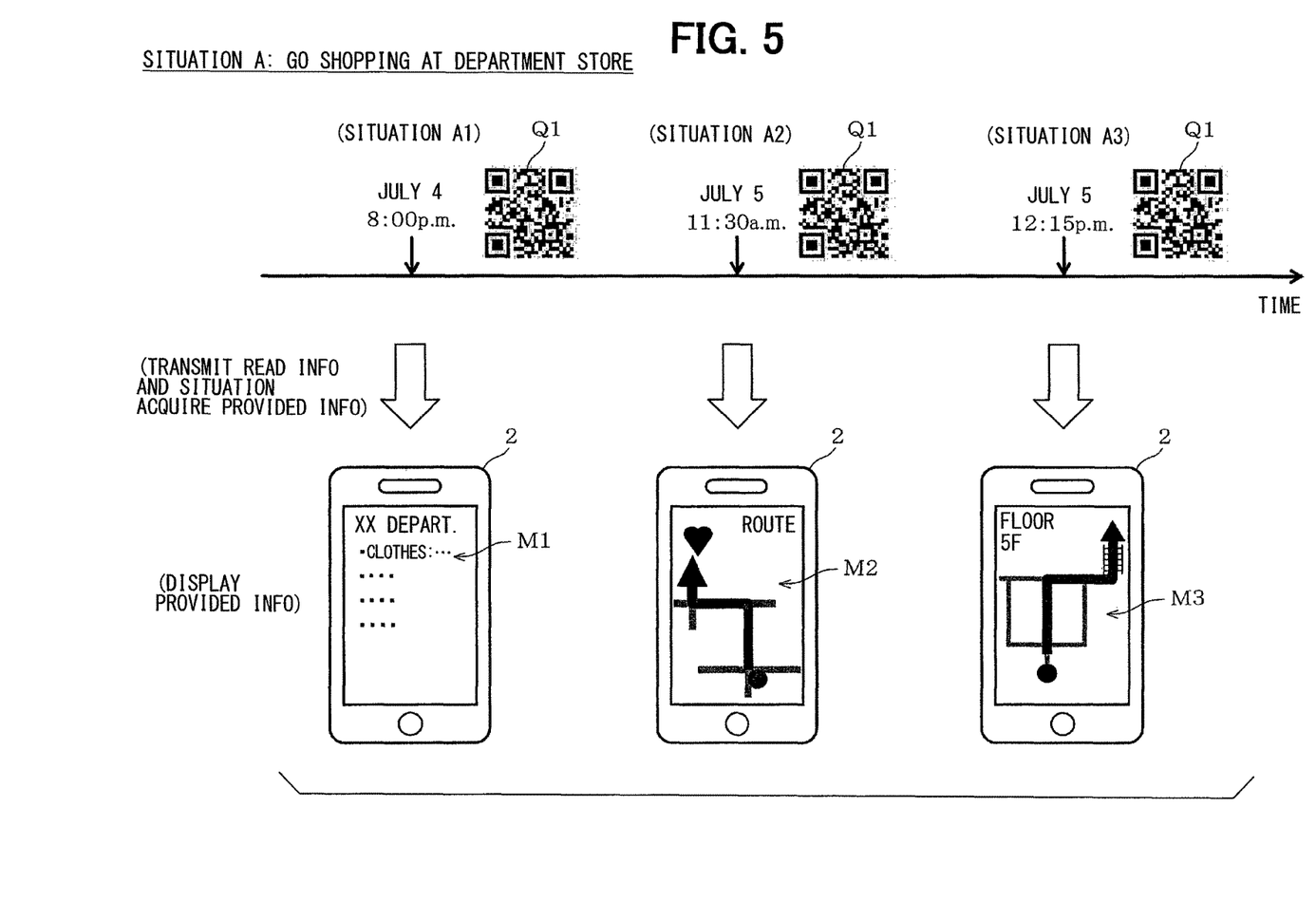
FIG. 5 is a diagram illustrating schematically, in situation A, each situation when an information code is read and a provision mode of provided information in each situation.

Now, as illustrated in time series in FIG. 5, the situation A1 is where a user at home reads a QR code Q1 printed in a magazine at 8:00 p.m. on July 4 that is the day before July 5 on which the user plans to go shopping at XX department store. The QR code Q1 codes a URL of the homepage of XX department store. That is, the QR code Q1 contains a predetermined network address, which is different from the predetermined network address positioning the server 3 in the wide area network.

When a manipulation of reading the QR code Q1 is performed, the portable terminal 2 acquires, as a situation transmitted to the server 3, the following: position information on home (refer to FIG. 2), an action schedule to go shopping at XX department store on July 5, a present position where the QR code Q1 is read and a present clock time when the QR code Q1 is read, and a URL of XX department store serving as the read information (S2 in FIG. 4). The portable terminal 2 transmits the situation and read information that are acquired, to the server 3 (S3 in FIG. 4). The situation transmitted is used as a determination source to determine a situation in the server 3. Note that the present position is equal to the position of home in the situation A.

The server 3 acquires the read information and the situation from the portable terminal 2 (S4 in FIG. 4), and determines a situation based on the read information and the situation which are received, generating provided information matching with the determined situation (S12 in FIG. 4). Here, the server 3 determines that the position at which the QR code Q1 is read is the home from the position information on home and the present position. In addition, the server 3 determines that it is the day before the day on which the user goes shopping at XX department store from the action schedule and the present clock time. The server 3 thereby eventually determines that the user investigates the goods that the user shops at XX department store from the situation and the read information (i.e., URL of the XX department store). Such determination is performed by the situation determination section 20b.

After determining, the server 3 extracts the information on goods for shopping, i.e., the information on goods currently treated at XX department store, or the information on counter, from the DB 22, and aggregates the above various information, generating the provided information for providing to the user. The generation of the provided information is performed by the provided information generation section 20c. Following generating the provided information, the server 3 transmits the generated provided information to the portable terminal 2 (S13 in FIG. 4). If the action schedule includes, for instance, the information indicating buying a dress, a shop selling the dress may be previously extracted for generating the provided information.

The portable terminal 2 receives the provided information from the server 3 and generates displayed information based on the received provided information (S4 in FIG. 4). The displayed information may include text data listing brand names and shop names. The portable terminal 2 displays the generated displayed information in the display unit 13 (S5 in FIG. 4). The display unit 13 of the portable terminal 2 is permitted to display as the displayed information M1 the list of goods etc. which are treated at XX department store, as in the situation A1 in FIG. 5. This configuration can provide a user having read the QR code Q1 for investigating goods, with the provided information matching with the situation, such as the information on goods that are treated in XX department store in this instance.

<Situation A2>

The situation A2 is where the user reads the QR code Q1 at home at 11:30 a.m. on July 5 on which the user plans to go shopping at XX department store. The QR code Q1 having been read at the situation A1 is assumed to be read out from the memory 11. The QR code Q1 read out from the memory 11 is the same QR code Q1; thus the read information at the situation A1 is identical to the read information at the situation A2.

In this case, the portable terminal 2 acquires, as a situation transmitted to the server 3, the following: the position information on home; an action schedule; the present position at which the QR code is read and the present clock time at which the QR code is read; and the read information being a URL of xx department store. The portable terminal 2 transmits the situation and read information that are acquired, to the server 3. Note that the present position is almost equal to the position of home in this case.

The server 3 acquires the read information and the situation from the portable terminal 2, and determines a situation based on the read information and the situation which are received, generating provided information matching with the determined situation. Here, the server 3 determines that the position at which the QR code Q1 is read is home from the position information on home and the present position, while determining that the user is going to investigate a route to XX department store from the action schedule and the present clock time.

Following determining the situation, the server 3 generates the position information on XX department store as provided information for providing the user. The server 3 transmits the generated provided information to the portable terminal 2. That is, in the situation A2, the provided information provided to the user is used when the user having performed a manipulation of reading the information code takes an action accompanied by travel.

The portable terminal 2 receives the provided information from the server 3 and generates displayed information based on the received provided information. Such displayed information may include the information indicating a route to the provided position information, i.e., image data indicating the route when moving by automobile from home to XX department store. The display unit 13 of the portable terminal 2 is thus permitted to display as the displayed information M2 the route of moving from home to XX department store, as in the situation A2 in FIG. 5. The above configuration can provide the user having read the QR code Q1 in order to investigate a traveling route with the provided information matching with the instant situation. Another configuration may be provided where the server 3 may further retrieve a traveling route and transmits the result of retrieving to the communication terminal.

In addition, the user having read an identical QR code Q1 can be provided with different provided information depending on the clock time.

<Situation A3>

The situation A3 is where the user reads the QR code Q1 at XX department store at 12:15 p.m. on July 5. The QR code Q1 read at the situation A1 is assumed to be read out from the memory 11. The portable terminal 2 acquires, as a situation transmitted to the server 3, the following: an action schedule; a present position at which the QR code is read and a present clock time at which the QR code is read; and the read information being a URL of xx department store. The portable terminal 2 transmits the situation and read information that are acquired, to the server 3. Note that the present position is almost equal to the position of XX department store in this case.

The server 3 acquires the read information and the situation from the portable terminal 2, and determines a situation based on the read information and the situation which are received, generating provided information matching with the determined situation. The server 3 determines that the user arrives at XX department store and is going to search for counters since the present position is XX department store and the present clock time is immediately after a scheduled clock time when shopping is started.

Following determining the situation, the server 3 generates the information allowing retrieval of counters for sale such as floor guide map in XX department store as provided information for providing the user. For instance, in the situation A1, the goods which the user retrieved may be previously recorded in the DB 22. Thereby, the information indicating that the counter selling such goods is located in the fifth floor may be provided collectively. The server 3 transmits the generated provided information to the portable terminal 2. If the action schedule includes, for instance, the information indicating buying a dress, a travel route to a shop selling the dress may be transmitted as the provided information.

The portable terminal 2 receives the provided information from the server 3 and generates displayed information based on the received provided information. Such displayed information may include image data of floor guide map in XX department store. The display unit 13 of the portable terminal 2 is thus permitted to display as the displayed information M3 the floor guide map in XX department store, as in the situation A3 in FIG. 5. That is, the user who tries to retrieve the counter may be provided with the provided information matching the instant situation.

<<Situation B>>

Figure 7:
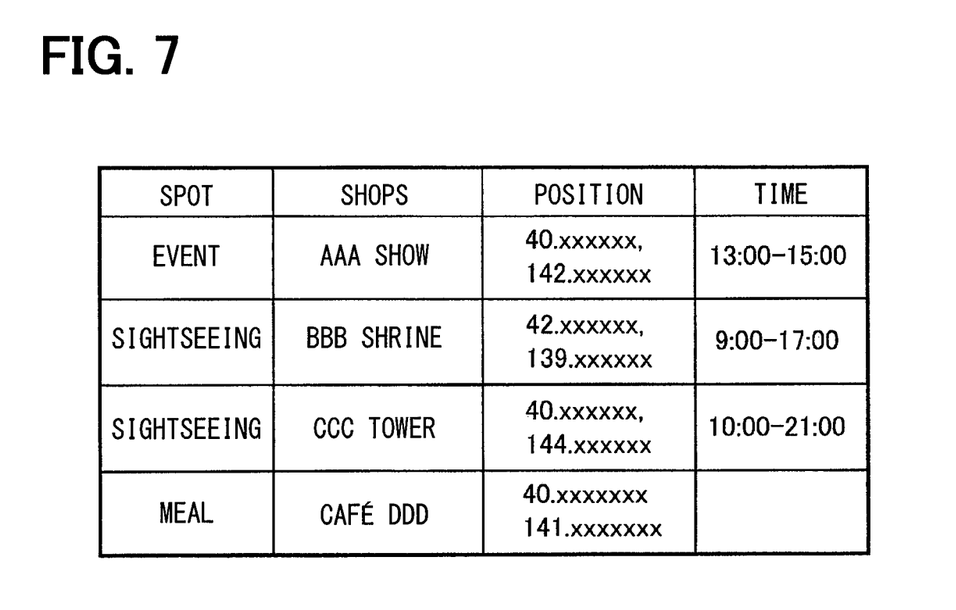
FIG. 7 is a diagram illustrating an example of information registered in a database of a server in situation B.

The situation B assumes that the information exemplified in FIG. 2 is registered in the portable terminal 2 that the user owns, and the information exemplified in FIG. 3 and the information on sightseeing spots near the hall exhibiting a show exemplified in FIG. 7 are registered in the DB 22 in the server 3.

<Situation B1>

Figure 6:
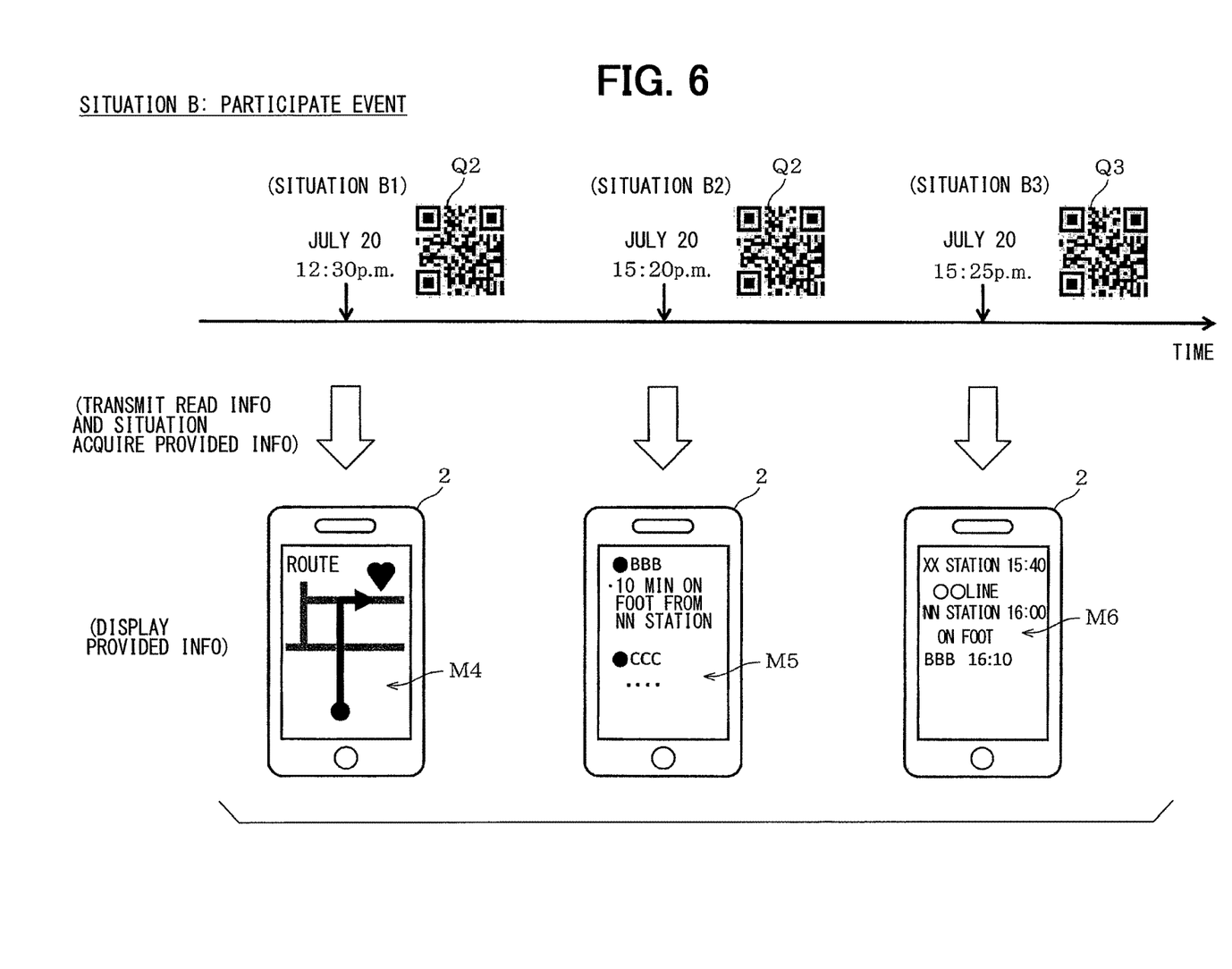
FIG. 6 is a diagram illustrating schematically, in situation B, each situation when an information code is read and a provision mode of provided information in each situation.

Now, as illustrated in time series in FIG. 6, the situation B1 is where a user reads the QR code Q2 printed in a ticket, etc. at 12:30 p.m. on July 20, i.e., 30 minutes before seeing AAA show (refer to FIG. 2). The QR code Q2 is assumed to code the information about AAA show, such as the position of the hall and the timetable of the show, without containing any network address.

Following a manipulation of reading the QR code Q2 is performed, the portable terminal 2 acquires, as a situation transmitted to the server 3, the following: a schedule to see MA show on July 20; a present position at which the QR code Q2 is read and a present clock time at which the QR code Q2 is read; and the read information being the information about AAA show. The portable terminal 2 transmits the situation and read information that are acquired, to the server 3.

The server 3 acquires the read information and the situation from the portable terminal 2, and determines a situation based on the read information and the situation which are received, generating provided information matching with the determined situation. Here, the server 3 determines that the user reads the QR code Q2 in order to retrieve a route to the hall, from the present position, the action schedule, the present clock time, etc. Following determining the situation, the server 3 generates provided information that is provided to the use; the provided information is the information indicating a route from the present position to the hall such as the information on a travel route for moving on foot from the station to the hall. The server 3 transmits the generated provided information to the portable terminal 2. Here, the position information on the hall may be transmitted as the provided information. In contrast, since the travel route is between public facilities of the station and the hall, the server may further prepare a guide map as the provided information.

The portable terminal 2 receives the provided information from the server 3 and generates displayed information based on the received provided information. Such displayed information is assumed to be image data indicating the travel route from home to the hall. The display unit 13 of the portable terminal 2 is thus permitted to display as the displayed information M4 the travel route from home to the hall, as in the situation B1 in FIG. 6. The above configuration can provide the user having read the QR code Q2 in order to investigate a travel route with the provided information matching with the situation.

<Situation B2>

The situation B2 is where the user reads the QR code Q2 at 15:20 on July 20, i.e., 20 minutes after the end of AAA show (refer to FIG. 2).

When a manipulation of reading the QR code Q2 is performed, the portable terminal 2 acquire as a situation to be transmitted to the server 3, the following: AAA show taking place until 15:00; the present position at which the QR code Q2 is read and the present clock time at which the QR code Q2 is read; and the read information. The portable terminal 2 transmits the situation and read information that are acquired, to the server 3.

The server 3 acquires the read information and the situation from the portable terminal 2, and determines a situation based on the read information and the situation which are received, generating provided information matching with the determined situation. The server 3 considers the present position, the action schedule, the present clock time, etc., i.e., AAA show being completed, the present time 15:20 being comparatively early, and the situation B1 undergoing retrieving a travel route from the station. The server 3 thereby determines that the user reads the QR code Q2 in order to search for neighboring sightseeing spots reachable on foot or on train. When the situation is determined, the server 3 extracts information on famous spots near the present position from the DB 22 (refer to FIG. 7), and generates the extracted information as provided information for providing the user. The server 3 transmits the generated provided information to the portable terminal 2.

The portable terminal 2 receives the provided information from the server 3 and generates displayed information based on the received provided information. Such displayed information is assumed to be a list or related data such as positions or photos of neighboring sightseeing spots. The display unit 13 of the portable terminal 2 is thus permitted to display as the displayed information M5 the neighboring sightseeing spots, as in the situation B2 in FIG. 6. The above configuration can provide the user having read the QR code Q2 for retrieving sightseeing spots in neighborhood, with the provided information matching with the situation.

<Situation B3>

The situation B3 is where the user reads the QR code Q3 coding BBB shrine 15:25 on July 20, i.e., five minutes after retrieving neighboring sightseeing spots in the situation B2. Note that the QR code Q3 is assumed to be printed on a signboard for sightseeing guide or pamphlet.

When a manipulation of reading the QR code Q3 is performed, the portable terminal 2 acquires, as a situation to be transmitted to the server 3, the following: a present position at which the QR code Q3 is read and a present clock time at which the QR code Q3 is read; and the read information. The portable terminal 2 transmits the situation and read information that are acquired, to the server 3.

The server 3 acquires the read information and the situation from the portable terminal 2, and determines a situation based on the read information and the situation which are received, generating provided information matching with the determined situation. The server 3 considers the present position, the action schedule, the present clock time, and the sightseeing spot being retrieved in the situation B2. The server 3 thereby determines that the user reads the QR code Q3 in order to investigate BBB shrine and the user uses a train for travel route. When the situation is determined, the server 3 retrieves a travel route to BBB shrine from the DB 22 (refer to FIG. 7), and generates the retrieved travel route as provided information for providing the user. The server 3 transmits the generated provided information to the portable terminal 2.

The portable terminal 2 receives the provided information from the server 3 and generates displayed information based on the received provided information. Such displayed information is assumed to be a travel route to BBB shrine by train. The display unit 13 of the portable terminal 2 is thus permitted to display as the displayed information M6 the information about the near station or transfer station, as in the situation B3 in FIG. 6. That is, the user who moves to BBB shrine by train may be provided with the provided information matching with the situation.

<<Situation C>>

Figure 8:
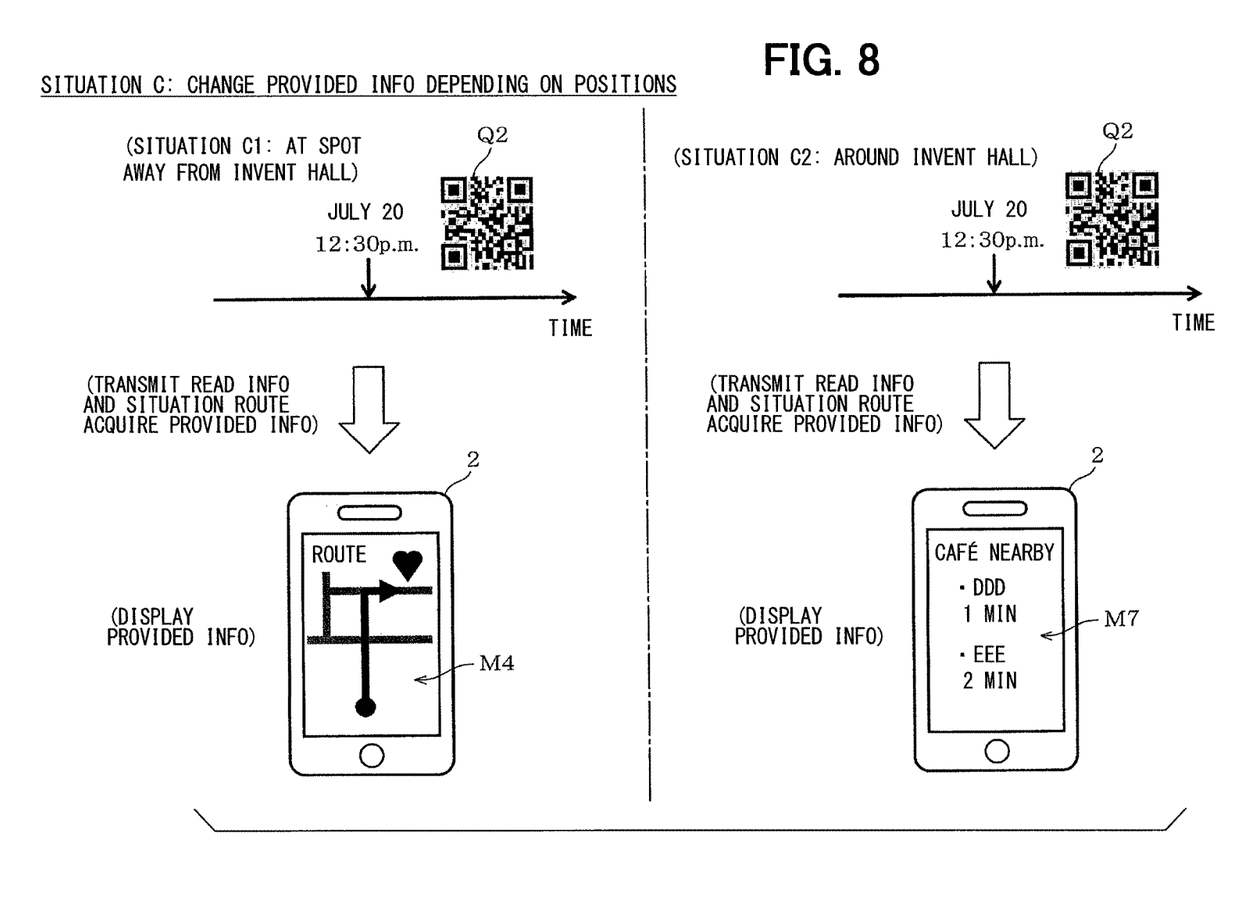
FIG. 8 is a diagram illustrating schematically, in situation C, each situation when an information code is read and a provision mode of provided information in each situation.

The situation C assumes that the information exemplified in FIG. 2 is registered in the portable terminal 2 that the user owns, and the information exemplified in FIG. 3 is registered in the DB 22 in the server 3. Note that the situation C is an example where the identical QR code Q2 is read at identical clock time at each of mutual different positions.

The situation C1, which is the same as the above-mentioned situation B1, is illustrated for comparison; thus detailed explanation is omitted. The situation C1 is where the QR code Q2 is read at a station near the hall, for instance. The display unit 13 of the portable terminal 2 displays as the displayed information M4 the travel route from the station to the hall.

In contrast, the situation C2 is where the QR code Q2 is read in proximity of the hall, i.e., a different user having arrived at the hall reads the QR code Q2 printed on a ticket. When the user performs a manipulation of reading the QR code Q2, the portable terminal 2 transmits, to the sever 3, the situation such as the present position, the present clock time, the action schedule, and the read information, like in the situation B1.

The server having received the situation considers the present position being the event hall and the present clock time being 12:30 still thirty minutes before the start of the show, and thereby determines that the user wants to rest until the show starts. Following determining the situation, the server 3 retrieves from the DB 22 the spots for resting until the start of the show such as a teahouse or light meal store, which is located within a several-minutes walking area from the hall, and generates the retrieved information as provided information. The server 3 transmits the generated provided information to the portable terminal 2.

The portable terminal 2 receives the provided information from the server 3 and generates displayed information based on the received provided information. Such displayed information becomes a travel route to reach a cafe or teahouse near the hall. The display unit 13 of the portable terminal 2 is thus permitted to display as the displayed information M7 the information on the name and position of the cafe for resting, as in the situation C2 in FIG. 8.

Thus, the user having read an identical QR code Q2 can be provided with different kinds of the provided information depending on positions.

<<Other Provision Modes of Provided Information>>

The provision mode of providing the provided information directly is exemplified so far; alternatively, another provision mode may be provided to use easily the provided information. In particular, as in FIG. 9, the display unit 13 of the portable terminal displays the read information obtained by decoding the QR code basically, or an action typically performed based on the read information. Such an action includes the activation of a browser and the display of the WEB site corresponding to a URL if the URL coded as an information code serves as the read information.

For instance, the QR code Q1 coding the URL of XX department store is assumed to be read (or read out from the memory 11). In such a case, the portable terminal 2 displays the homepage of XX department store as a typical action, as the displayed information M10 in FIG. 9.

Figure 9:
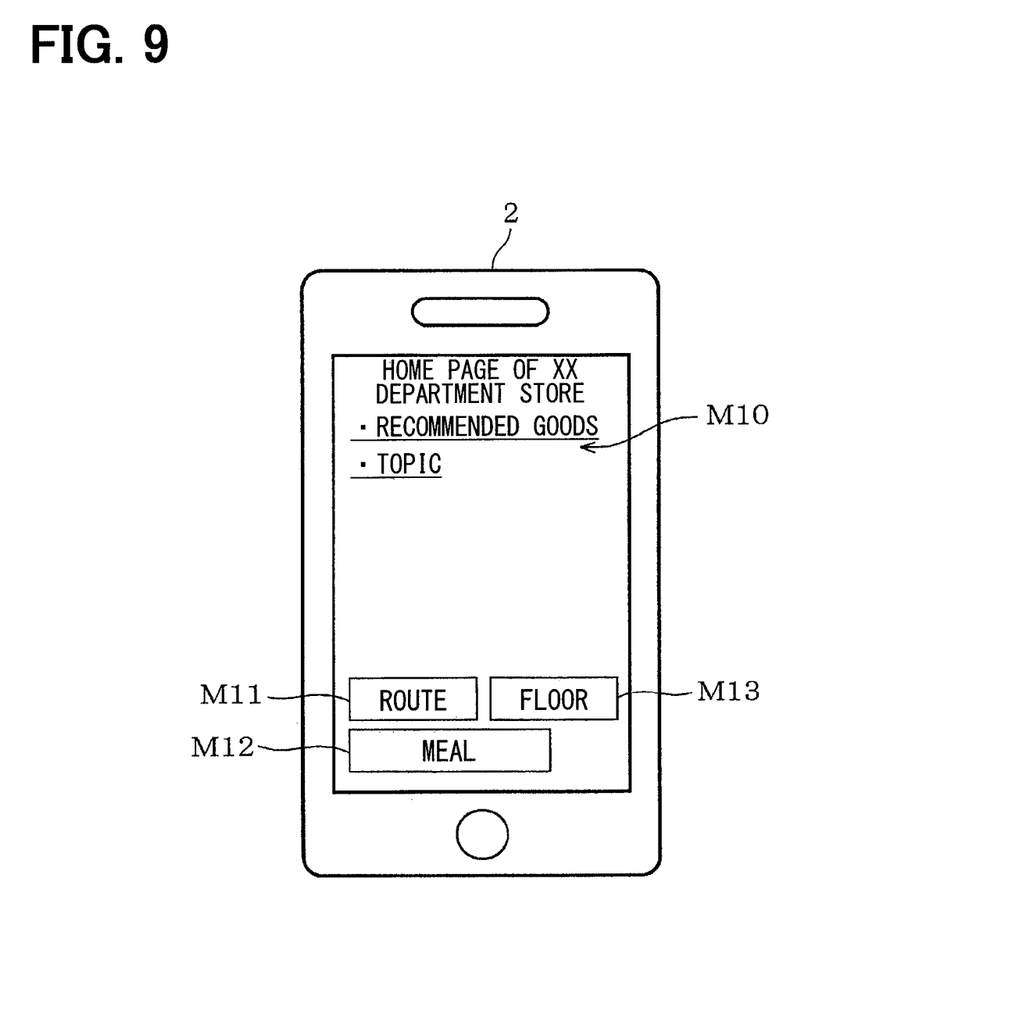
FIG. 9 is a diagram illustrating schematically another example of a provision mode of provided information.

Here, the portable terminal 2 generates the indication buttons M11 to M13 as the displayed information based on the received provided information, and displays the generated ones in the display unit 13. For example, the indication button M11 is a button for displaying a travel route from XX department store to home. In addition, the indication button M12 is a button for displaying a floor guide map of XX department store. In addition, the indication button M13 is a button for displaying a floor guide map of XX department store.

Displaying the indication buttons M11-M13 for displaying such provided information can prevent the provided information such as a travel route from being displayed against the user's intention to try to open the homepage purely.

Further, whether to display the indication buttons for displaying such provided information or display the provided information directly may be determined depending on a determination result by the server 3. That is, suppose the case that the present position is XX department store and the QR code Q1 is read (or read out from the memory 11) at 2 p.m. on July 5. The portable terminal 2 thereby transmits the read information and the situation when the QR code is read to the server 3, like in the above-mentioned situations A to C. The server 3 generates the provided information based on the situation and read information, and transmits the generated ones to the portable terminal 2.

Under the above case, only the situation such as the transmitted present position, the present clock time, or the action schedule may not provide a clear basis for determining the user's intention such as wanting to go home after finishing shopping, wanting to look for another counter, or looking for a spot for resting after shopping. Such an unclear basis for determining may cause a user, who actually wants to go home, to be provided with a floor guide map. This may give the user an unfavorable impression that the information provision system 1 is inconvenient.

Then, another configuration may be assumed where a validity of the determination result be further determined. That is, when the determination result fails to provide a certain amount of validation, another configuration of displaying indication buttons for displaying the provided information may be selected. This secures a convenience enabling an easy use of the provided information while reducing a possibility of giving the unfavorable impression.

The present embodiment may provide the following advantageous effects.

A situation when an information code coding predetermined information is read is determined based on (i) a situation when the information code is read and (ii) read information obtained by decoding the information code. Provided information is generated based on the determination result and provided; the provided information is different from the read information and matching with the situation when the information code is read. Such a configuration can provide information matching with various situations taking place when the information code coding predetermined information is read.

In addition, the read information code, or the read information obtained from the read information code is stored; when the information code or the read information obtained from the information code, which are stored, is read out, a situation is acquired similarly. This allows the user continuing holding the portable terminal 2 to reuse the information code at any time, raising convenience.

The provided information is provided which is the information used by a user who performs a manipulation of reading the information code when taking an action accompanied by a travel. This allows even an information code coding predetermined fixed information to provide services with users in wide areas.

Different kinds of provided information are generated to an identical information code based on determination results by a determination section or device. This can respond to various situations when the identical information code is read.

In particular, acquiring the position at the time of reading an information code as a situation may allow a determination, e.g., that the user wants to move to the position specified by the read information; this makes clearer the determination when generating the provided information, providing the provided information more matching with the situation.

Further, acquiring the clock time at the time of reading an information code makes clearer the determination when generating the provided information, providing the provided information more matching with the situation.

In addition, acquiring at least one of an action history and an action schedule of a user, who performs a manipulation of reading an information code, allows an estimate for an action of the user, making clearer the determination when generating the provided information, providing the provided information more matching with the situation.

The information provision system 1 has a configuration that includes a communication terminal and an external server 3. The communication terminal includes a reading section or device, a situation acquisition section or device, a provision section or device, and a terminal-side communication unit which communicates with the external server 3. The server 3 includes a communication unit that communicates with the communication terminal, a determination section or device, a provided information generation section or device, and a DB 22 which stores various kinds of information used for generating the provided information to be registered as being associated with each other. Such a configuration need not store so much information in the communication terminal, and prevents the increase in loads in the communication terminal since the provided information is generated in the server 3, thereby providing the information provision system 1 easily.

Here, the communication terminal includes a reading section or device, a situation acquisition section or device, a transmission section or device, a reception section or device, and a provision section or device. This can provide information matching with various situations taking place when the information code coding predetermined information is read. In addition, such configuration may be provided using computer programs and functions of a portable terminal 2 such as a known smart phone, eliminating need of preparing a dedicated communication terminal.

In addition, the information provision program executing a reading process, a situation acquisition process, a transmission process, a reception process, and a provision process can provide the information matching with various situations at a time when an information code coding predetermined information is read, while using easily the portable terminal 2 such as a commercially available smart phone for a communication terminal in the information provision system 1.

Other Embodiments

Without being limited to examples in the above-mentioned embodiment, the present disclosure may be modified or extended as far as not deviating from the scope.

In the embodiment, an information code is exemplified to be a QR code, but may be a one-dimensional bar code. In addition, without need to be limited to the QR code, another form of a two-dimensional bar code may be used.

In the situation A2 in FIG. 5 according to the embodiment, the server 3 may provide the provided information such as "present position: home" and "destination: XX department store"; the portable terminal 2 may activate a navigation program in the portable terminal 2 based on the received present position and the destination, and provide a travel route. That is, the provision process providing the provided information includes not only the process that provides the user by using the received information directly, like in the situation A1, but also the process providing the user by activating the program suitable for providing the received information.

In addition, the user's manipulation history on the portable terminal 2 may be used for the determination of the situation and the generation of the provided information. For example, the embodiment indicates an example of providing a travel route for traveling by automobile. In contrast, when information is stored where a history in manipulations indicates the frequent uses of route guidance services by train, such information may be transmitted to the server 3 as a situation, allowing the server 3 to determine that the user travels by train frequently. The travel route reaching XX department store by train may be thus provided; this helps prevent meaningless information such as a travel route by automobile from being mistakenly provided to a user who has no automobile, enabling the provision of the information close to the user's request.

In addition, a kind of terminal which reads an information code may be acquired as a situation, and used for generating the provided information. That is, if a so-called mobile phone having a display screen smaller than that of a smart phone is used, an amount of information to be displayed needs to be smaller than that of the smart phone. Thus, if the kind of terminal is a mobile phone, the provided information is generated to be reduced in the amount of information, providing the user with the information that is easy to see and of high convenience. In contrast, if the kind of terminal is one such as a tablet PC having a comparatively large display screen and a comparatively highly efficient CPU, more detailed information may be provided to the user by raising the amount of information or generating photographs or videos as provided information.

In addition, the determination of a situation and generation of the provided information may be based on information on attribute of a user such as gender, affiliation organization, age. For instance, in the situation C2, if a user is a woman, cake shops may be extracted to generate the provided information; if a user is a young man, a beef bowl chain store or hamburger shop may be extracted to generate the provided information. In addition, a user's preference may be acquired as a situation from a history in manipulations of the portable terminal 2 to generate the provided information matching with the situation.

In the embodiment, the information provision system 1 is provided to include the portable terminal 2 and the server 3. In contrast, the situation determination section 20b and the provided information generation section 20c may be provided in the portable terminal 2, allowing the portable terminal 2 alone to be included in the information provision system 1. In such cases, the DB 22 may be provided in the memory 11 of the portable terminal 2; alternatively, the portable terminal 2 may communicate with an external server 3 to access an external DB 22.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An information provision system comprising:
    a reading section that reads an information code that codes predetermined information;
    a situation acquisition section that acquires a situation when the information code is read by the reading section;
    a determination section that determines a situation when the information code is read, based on (i) read information that is obtained by decoding the information code that is read and (ii) the situation acquired by the situation acquisition section;
    a provided information generation section that generates provided information that is different from the read information, the provided information matching with the situation when the information code is read, based on a determination result by the determination section;
    a provision section that provides the provided information generated by the provided information generation section;
    a communication terminal that includes a terminal-side communication unit that communicates with the reading section, the situation acquisition section, the provision section, and an external source; and
    a server including a communication unit that communicates with the communication terminal via a wide area network, the determination section, the provided information generation section, and a database where a plurality of kinds of information, which are used to (i) determining by the determination section and (ii) generating the provided information by the provided information generation section, are registered to be associated with each other,
    wherein the server is positioned using a predetermined network address, by which the communication terminal communicates with the server, whereas the information code contains no network address,
    wherein the situation acquired by the situation acquisition section includes a future action schedule of a user; thereby the provision section provides the provided information matching with the situation including the future action schedule of the user.

2. The information provision system according to claim 1, further comprising:
    a storage unit that stores the information code read by the reading section or the read information obtained from the information code read by the reading section,
    wherein the situation acquisition section acquires the situation when the information code is read by the reading section, and when either the information code stored in the storage unit or the read information stored in the storage unit is read out from the storage unit, the situation is acquired.

3. The information provision system according to claim 1, wherein
    the provided information is used by the user, who performs a manipulation of reading the information code, when the user takes an action associated with travel.

4. The information provision system according to claim 1, wherein
    the provided information generation section generates different kinds of the provided information against the identical information code, based on the determination result by the determination section.

5. The information provision system according to claim 1, wherein
    the situation acquired by the situation acquisition section includes a position when the information code is read.

6. The information provision system according to claim 1, wherein
    the situation acquired by the situation acquisition section includes a clock time when the information code is read.

7. The information provision system according to claim 1, wherein
    the situation acquired by the situation acquisition section further includes at least either the user who performs a manipulation of reading the information code, or an action history of the user.

8. The information provision system according to claim 1, wherein
    the situation acquired by the situation acquisition section further includes a kind of a terminal that reads the information code.

9. The information provision system according to claim 1, wherein the situation acquired by the situation acquisition section further includes a position when the information code is read and a clock time when the information code is read.

10. An information provision system comprising:
    a reading section that reads an information code that codes predetermined information;
    a situation acquisition section that acquires a situation when the information code is read by the reading section;
    a determination section that determines a situation when the information code is read, based on (i) read information that is obtained by decoding the information code that is read and (ii) the situation acquired by the situation acquisition section;

a provided information generation section that generates provided information that is different from the read information, the provided information matching with the situation when the information code is read, based on a determination result by the determination section;

a provision section that provides the provided information generated by the provided information generation section;

a communication terminal that includes a terminal-side communication unit that communicates with the reading section, the situation acquisition section, the provision section, and an external source; and a server including a communication unit that communicates with the communication terminal via a wide area network, the determination section, the provided information generation section, and a database where a plurality of kinds of information, which are used to (i) determining by the determination section and (ii) generating the provided information by the provided information generation section, are registered to be associated with each other wherein the server is positioned using a predetermined first network address, by which the communication terminal communicates with the server, whereas the information code contains a second network address that is different from the first network address, wherein the situation acquired by the situation acquisition section includes a future action schedule of a user; thereby the provision section provides the provided information matching with the situation including the future action schedule of the user.

11. The information provision system according to claim 10, further comprising:

a storage unit that stores the information code read by the reading section or the read information obtained from the information code read by the reading section, wherein the situation acquisition section acquires the situation when the information code is read by the reading section, and when either the information code stored in the storage unit or the read information stored in the storage unit is read out from the storage unit, the situation is acquired.

12. The information provision system according to claim 10, wherein the situation acquired by the situation acquisition section further includes a kind of a terminal that reads the information code.

13. The information provision system according to claim 10, wherein the situation acquired by the situation acquisition section further includes a position when the information code is read and a clock time when the information code is read.

14. An information provision system comprising:

a reading section that reads an information code that codes predetermined information;

a situation acquisition section that acquires a situation when the information code is read by the reading section;

a determination section that determines a situation when the information code is read, based on (i) read information that is obtained by decoding the information code that is read and (ii) the situation acquired by the situation acquisition section;

a provided information generation section that generates provided information that is different from the read information, the provided information matching with the situation when the information code is read, based on a determination result by the determination section; and a provision section that provides the provided information generated by the provided information generation section, wherein the situation acquired by the situation acquisition section includes a future action schedule of a user and the provision section provides the provided information matching with the situation including the future action schedule of the user.

15. The information provision system according to claim 14, further comprising:

a storage unit that stores the information code read by the reading section or the read information obtained from the information code read by the reading section, wherein the situation acquisition section acquires the situation when the information code is read by the reading section, and when either the information code stored in the storage unit or the read information stored in the storage unit is read out from the storage unit, the situation is acquired.

16. The information provision system according to claim 14, wherein the situation acquired by the situation acquisition section further includes a kind of a terminal that reads the information code.

17. The information provision system according to claim 14, further comprising:

a communication terminal that includes a terminal-side communication unit that communicates with the reading section, the situation acquisition section, the provision section, and an external source; and a server including a communication unit that communicates with the communication terminal, the determination section, the provided information generation section, and a database where a plurality of kinds of information, which are used to (i) determining by the determination section and (ii) generating the provided information by the provided information generation section, are registered to be associated with each other.

18. The information provision system according to claim 14, wherein the situation acquired by the situation acquisition section further includes a position when the information code is read and a clock time when the information code is read.

* * * * *